US009814046B2

(12) United States Patent
Lee et al.

(10) Patent No.: US 9,814,046 B2
(45) Date of Patent: Nov. 7, 2017

(54) METHOD FOR CONTROLLING LONG RANGE WIDE AREA NETWORK APPARATUS

(71) Applicant: Gemtek Technology Co., Ltd., Hsinchu (TW)

(72) Inventors: Kuo-Tsai Lee, Hsinchu (TW); Cory Koon-Sing Lam, Hsinchu (TW)

(73) Assignee: GEMTEK TECHNOLOGY, CO., LTD., Hsinchu (TW)

( * ) Notice: Subject to any disclaimer, the term of this patent is extended or adjusted under 35 U.S.C. 154(b) by 70 days.

(21) Appl. No.: 15/152,147

(22) Filed: May 11, 2016

(65) Prior Publication Data

US 2017/0265192 A1    Sep. 14, 2017

(30) Foreign Application Priority Data

Mar. 9, 2016 (TW) .............................. 105107190 A

(51) Int. Cl.
 H04W 4/00  (2009.01)
 H04W 72/04  (2009.01)
 H04W 24/02  (2009.01)
 H04B 1/00  (2006.01)

(52) U.S. Cl.
 CPC ........ *H04W 72/0453* (2013.01); *H04B 1/005* (2013.01); *H04B 1/0064* (2013.01); *H04W 24/02* (2013.01)

(58) Field of Classification Search
None
See application file for complete search history.

(56) References Cited

U.S. PATENT DOCUMENTS

| 7,450,952 | B1 * | 11/2008 | Kaundinya | G06Q 10/087 340/10.32 |
| 8,160,001 | B2 * | 4/2012 | Bitran | H04W 16/14 370/327 |
| 8,982,820 | B1 * | 3/2015 | Cordeiro | H04W 48/16 370/329 |
| 9,468,078 | B1 * | 10/2016 | White | H05B 37/0272 370/329 |
| 2009/0204265 | A1 * | 8/2009 | Hackett | G05B 19/4185 700/284 |
| 2009/0310555 | A1 * | 12/2009 | Huo | H04W 72/082 370/329 |
| 2009/0310565 | A1 * | 12/2009 | Huo | H04W 24/02 370/331 |
| 2009/0312022 | A1 * | 12/2009 | Viorel | H04W 4/20 455/436 |
| 2010/0238083 | A1 * | 9/2010 | Malasani | H01Q 1/125 343/765 |

(Continued)

*Primary Examiner* — Anh-Vu Ly
(74) *Attorney, Agent, or Firm* — Nixon Peabody LLP

(57) ABSTRACT

A method for controlling Long Range Wide Area Network (LoRa) apparatus includes: selecting a first transceiver and a second transceiver among a plurality of transceivers, assigning a first set of frequency bands to the first transceiver, assigning a second set of frequency bands, different from the first set of frequency bands, to the second transceiver, setting the first transceiver so that the first transceiver embeds a first flag in a first request when sending the first request to a mother node and setting the second transceiver so that the second transceiver embeds the first flag in the first request when sending the first request to the mother node.

9 Claims, 2 Drawing Sheets

(56) References Cited

U.S. PATENT DOCUMENTS

| | | | |
|---|---|---|---|
| 2010/0316003 A1* | 12/2010 | Sukiasyan | H04W 72/02 370/329 |
| 2012/0009886 A1* | 1/2012 | Poulin | H04B 1/0064 455/78 |
| 2013/0070688 A1* | 3/2013 | Picker | H04W 88/08 370/329 |
| 2014/0274225 A1* | 9/2014 | Lacatus | H04W 24/08 455/574 |
| 2016/0174227 A1* | 6/2016 | Martin | H04W 72/0453 370/329 |
| 2016/0285611 A1* | 9/2016 | Fischer | H04L 5/0062 370/329 |
| 2017/0094475 A1* | 3/2017 | Nolan | H04L 67/10 370/329 |

* cited by examiner

METHOD FOR CONTROLLING LONG RANGE WIDE AREA NETWORK APPARATUS

CROSS-REFERENCE TO RELATED APPLICATIONS

This non-provisional application claims priority under 35 U.S.C. §119(a) on Patent Application No(s). 105107190 filed in Taiwan, R.O.C. on Mar. 9, 2016, the entire contents of which are hereby incorporated by reference.

TECHNICAL FIELD

The disclosure relates to a method for controlling Long Range Wide Area Network apparatuses based on the disposition of transceivers.

BACKGROUND

Long Range Wide Area Network (LoRaWAN/LoRa) is a network communication technique developed and promoted by International Business Machine (IBM). Electronic devices can be more easily utilized in the filed of Internet of Things (IoT) via the technique of LoRa.

However, different countries have different numbers of frequency bands of LoRa and distributions of frequency bands of LoRa due to the difference of available frequency bands and limitations of regulations. This situation significantly increases the difficulty and the cost of disposing LoRa.

SUMMARY

According to an embodiment, a method for controlling Long Range (LoRa) Wide Area Network (WAN) apparatuses is disclosed. In the method, a first transceiver is selected among a plurality of transceivers. A first set of frequency bands is assigned to the first transceiver. A second transceiver is selected among the aforementioned transceivers. A second set of frequency bands, which is different from the first set of frequency bands, is assigned to the second transceiver. The first transceiver is set so that the first transceiver embeds a first flag in a first request when sending the first request to a mother node. The second transceiver is set so that the second transceiver embeds the first flag in the first request when sending the first request to the mother node.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
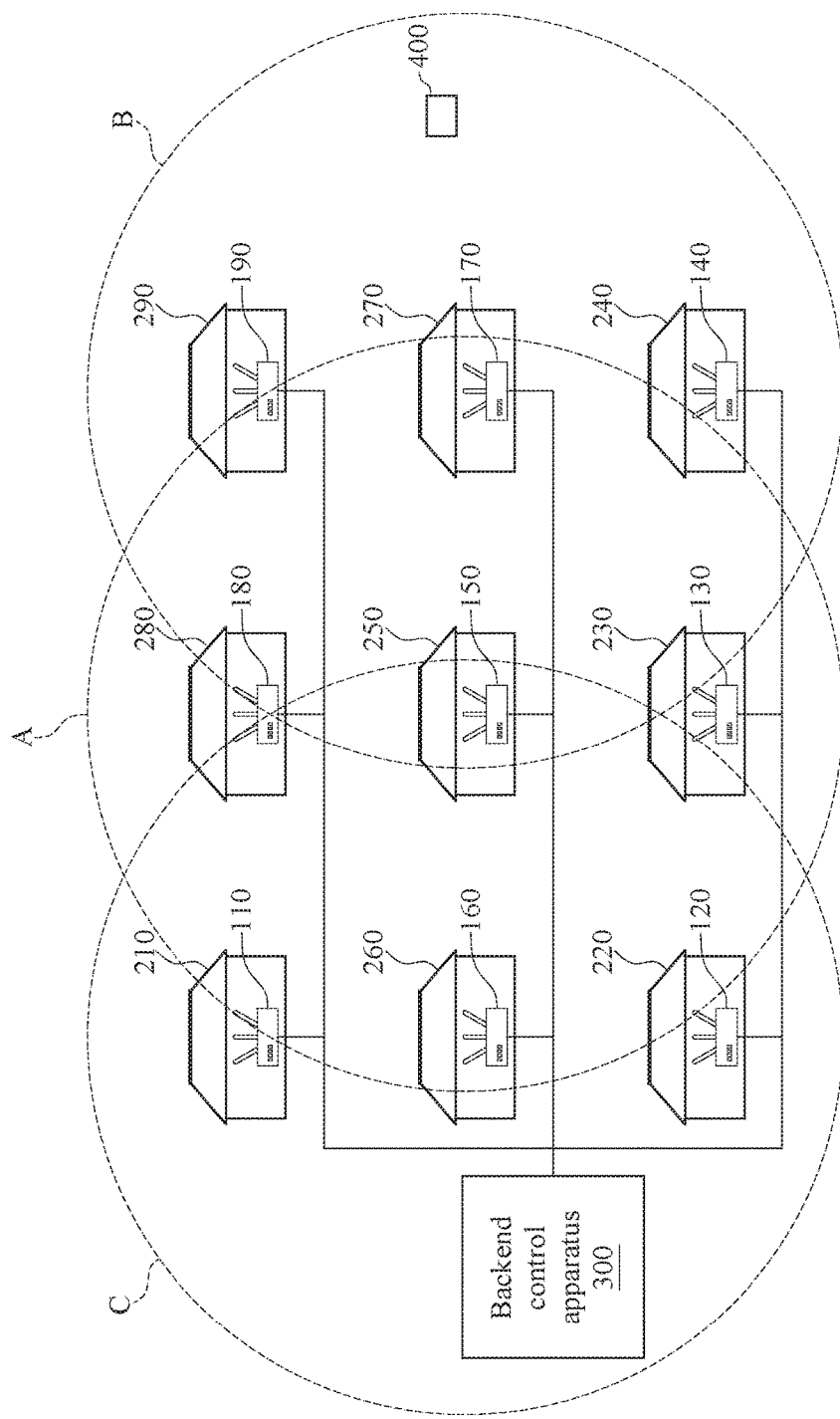
FIG. 1 is a block diagram of a plurality of Long Range Wide Area Network (LoRa) apparatuses in an embodiment.
Figure 2:
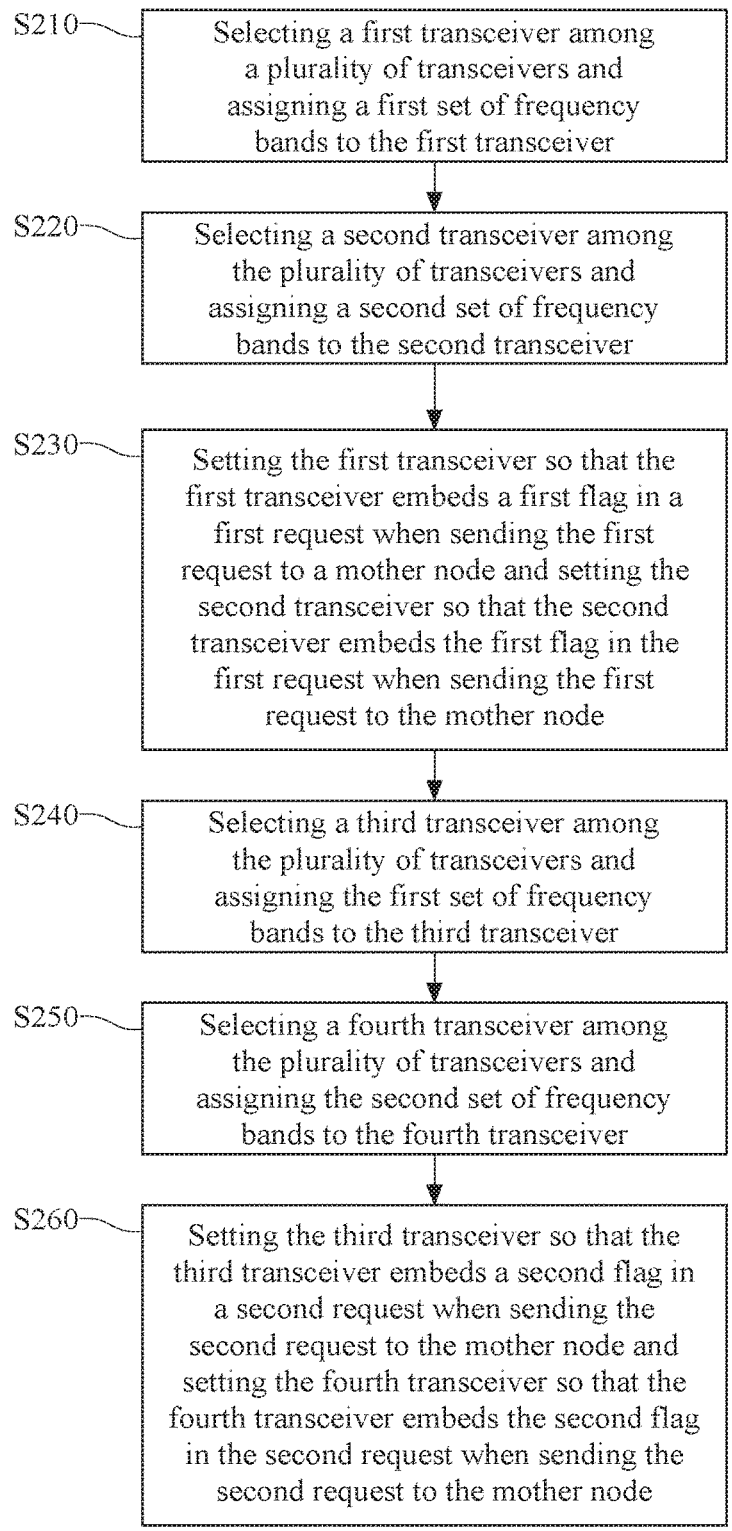
FIG. 2 is a flow chart of a method for controlling Long Range Wide Area Network (LoRa) apparatuses in an embodiment.

Please refer to FIG. 1 and FIG. 2. FIG. 1 is a block diagram of a plurality of LoRa WAN apparatuses in an embodiment and FIG. 2 is a flow chart of a method for controlling LoRa WAN apparatuses in an embodiment. As shown in FIG. 1, a plurality of LoRa WAN transceivers (referred to LoRa transceiver hereinafter) 110~190 is respectively disposed in a plurality of buildings 210~290 and is connected to a backend control apparatus 300 via a cable network or a wireless network so that the backend control apparatus 300 is utilized as a mother node of the LoRa transceivers. A terminal device 400 communicates with the backend control apparatus 300 via one of the LoRa transceivers. The backend control apparatus 300 controls the LoRa transceivers by a control method as shown in FIG. 2.

First of all, as shown in step S210, when the backend control apparatus 300 needs to set a first logical transceiver, the backend control apparatus 300 selects one of the LoRa transceivers 110~190 as a first transceiver and assigns a first set of frequency bands to the selected LoRa transceiver. In the case of the embodiment shown in FIG. 1, the backend control apparatus 300 selects the LoRa transceiver 150 as a first transceiver, and the LoRa transceiver 150 is set by the backend control apparatus 300 so that the LoRa transceiver 150 operates in the range from the first frequency band to the eighth frequency band.

As shown in step S220, the backend control apparatus 300 selects one LoRa transceiver among the LoRa transceivers except the first transceiver to be a second transceiver and assigns a second set of frequency bands, different from the first set of frequency bands, to the selected LoRa transceiver. In the case of the embodiment shown in FIG. 1, the backend control apparatus 300 selects the LoRa transceiver 170 as a second transceiver and sets the LoRa transceiver 170 so that the LoRa transceiver 170 operates in the range from the ninth frequency band to the sixteenth frequency band.

Moreover, as shown in step S230, the backend control apparatus 300 sets the selected first transceiver so that the first transceiver embeds a first flag in a request when sending the request to the backend control apparatus 300, and sets the selected second transceiver so that the second transceiver embeds the first flag in the request when sending the request to the backend control apparatus 300. For example, as shown in FIG. 1, the LoRa transceiver 150 embeds the first flag in a request when sending the request to the backend control apparatus 300, and the LoRa transceiver 170 embeds the first flag in a request when sending the request to the backend control apparatus 300. The backend control apparatus 300 logically recognizes the LoRa transceiver 150 and the LoRa transceiver 170 as a first network (child) node via the first flag.

Based on the aforementioned control method, when the terminal device 400 needs to send data to the backend control apparatus 300, the terminal device 400 sends the data to the first transceiver (e.g. the LoRa transceiver 150) or the second transceiver (e.g. the LoRa transceiver 170) via at least one of the first to sixteen frequency bands. The transceiver, such as LoRa transceiver 170, which receives the data from the terminal device 400, embeds the first flag and the data of the terminal device in the received data and then sends the received data to the backend control apparatus 300. Therefore, the backend control apparatus 300 can recognize that the data is sent from the terminal device 400 via the first network (child) node. Moreover, to the terminal device 400, connecting to the backend control apparatus 300 via the LoRa transceiver 150 and the LoRa transceiver 170 is equivalent to connecting to the backend control apparatus 300 via a base station operating in sixteen frequency bands.

In an embodiment, in step S220, the second transceiver is selected according to a position of the first transceiver. For example, if the backend control apparatus 300 would like to dispose each LoRa transceiver with a strategy to achieve the best signal quality, the backend control apparatus may select the LoRa transceiver, closest to the first transceiver (e.g. the LoRa transceiver 150), as the second transceiver so that the signal coverage of the first transceiver and the signal coverage of the second transceiver greatly overlap each other. The terminal device 400 is allowed to send data to the backend control apparatus 300 via any of the sixteen frequency bands within the overlap between the signal coverage of the two transceivers. Optionally, if the backend control apparatus 300 would like to dispose each LoRa transceiver with a strategy to achieve the maximum signal coverage, the backend control apparatus 300 may select a LoRa transceiver, which is within a proper distance (such as 5 to 6 kilometers) from the first transceiver (e.g. LoRa transceiver 150), as a second transceiver. However, the disclosure is not limited to the above embodiments, and the backend control apparatus 300 is allowed to select an appropriate LoRa transceiver as the second transceiver with a variety of disposition strategies according to the position of the first transceiver.

In an embodiment, when the terminal device 400 would like to communicate with the backend control apparatus 300 via the first network node, the terminal device 400 sends a request to the LoRa transceiver 150 as the first transceiver of the first network node, so the LoRa transceiver 150 notifies the backend control apparatus 300 of the request after processing it. The backend control apparatus 300 further notifies the second transceiver of the first network node, the LoRa transceiver 170. Thus, the LoRa transceiver 150 and the LoRa transceiver 170 are set to provide services to the terminal device 400.

Thus, in an embodiment, when the terminal device 400 sends a request to the backend control apparatus 300 via the first network node, the terminal device 400 sends the request to the backend control apparatus 300 via the LoRa transceiver 150 or the LoRa transceiver 170. When the backend control apparatus 300 would like to response to the request, the backend control apparatus 300 sends the response to the LoRa transceiver 150 and the LoRa transceiver 170, and then the LoRa transceiver 150 and the LoRa transceiver 170 send the response to the terminal device 400 via their frequency bands.

In another embodiment, the backend control apparatus 300 further selects a third transceiver among the LoRa transceivers 110~140, 160 and 180~190 and assigns a third set of frequency bands, different from the first set of frequency bands, to the third transceiver. Please refer to the embodiment of FIG. 1, the backend control apparatus 300 selects the LoRa transceiver 160 as the third transceiver and sets the LoRa transceiver 160 so that the LoRa transceiver 160 operates in a set of frequency bands different from the first set of frequency bands, and the LoRa transceiver 160 embeds the first flag in a request when sending the request to the backend control apparatus 300. Thus, the LoRa transceiver 150, the LoRa transceiver 160 and the LoRa transceiver 170 are recognized as the first network node by the backend control apparatus 300.

In an embodiment, the third set of frequency bands includes the seventeenth to twenty-fourth frequency bands. In another embodiment, the third set of frequency bands includes the thirteenth to eighteenth frequency bands. In yet another embodiment, the third set of frequency bands includes the ninth to sixteenth frequency bands. For example, the LoRa transceiver 160 is set to operate in the range from the ninth frequency band to the sixteenth frequency band, and the disposition of the signal coverage C of the LoRa transceiver 160 and the signal coverage B of the LoRa transceiver 170 allows the terminal device 400 to use all sixteen frequency bands no matter where the terminal device 400 is located within the signal coverage A of the LoRa transceiver 150.

In an embodiment, when the terminal device 400 is within the overlap between the signal coverage B and the signal coverage C and sends data via the thirteenth frequency band, the data will be received by the LoRa transceiver 160 and the LoRa transceiver 170 and sent to the backend control apparatus 300. In other words, the backend control apparatus 300 will receive two sets of data which are the same. More specifically, the two sets of data have the same content of data, the same information of the terminal device and the same first flag. The time difference that the backend control apparatus 300 receives the two sets of data is extremely small due to the features of internet transmission. Thus, in an embodiment, if the backend control apparatus 300 receives a second set of data which is the same as a first set of data within a period of time (such as 200 ms) after receiving the first set of data, the backend control apparatus 300 will consider that the two sets of data are the same, and will process either the first set of data or the second set of data.

In another embodiment, although the LoRa transceiver 160 is selected and set by the backend device 300 to operate in the range from the ninth frequency band to the sixteenth frequency band, the backend control apparatus 300 will set the LoRa transceiver 160 in a dormant state instead of immediately activating the LoRa transceiver 160. The backend control apparatus 300 will determine whether to activate the LoRa transceiver 160 according to the operating status of the second transceiver, which is the LoRa transceiver 170.

In an embodiment, a controller embedded in the LoRa transceiver 170 sends a failure signal to the backend control apparatus 300 when the function of the wireless base station of the LoRa transceiver 170 becomes abnormal or fails. The backend control apparatus 300 controls the LoRa transceiver 160 to operate in the range from the ninth frequency band to the sixteenth frequency band. Moreover, the backend control apparatus 300 is further capable of setting the LoRa transceiver 170 in a dormant state. The aforementioned function abnormality could be, for example, that the eleventh frequency band fails.

In another embodiment, the backend control apparatus 300 regularly or irregularly sends a polling signal to each connected LoRa transceiver. If the frequency of non-response of the LoRa transceiver 170 to the polling signal reaches a certain frequency, the backend control apparatus 300 determines that the LoRa transceiver 170 fails. Therefore, the backend control apparatus 300 activates the LoRa transceiver 160 and sets the LoRa transceiver 160 to operate in the range from the ninth frequency band to the sixteenth frequency band.

In an embodiment, please refer to FIG. 2, and the method further includes the following steps. As shown in step S240, the backend control apparatus 300 selects the LoRa transceiver 120 among the LoRa transceivers 110~140 and 180~190 and assigns the first set of frequency bands (the first frequency band to the eighth frequency band) to the LoRa transceiver 120, wherein the position of the LoRa transceiver 120 is different from the position of the LoRa transceiver 150. As shown in step S250, the backend control apparatus 300 then selects the LoRa transceiver 140 and assigns the second set of frequency bands (the ninth frequency band to the sixteenth frequency band) to the LoRa transceiver 140. As shown in step S260, the backend control apparatus 300 sets the LoRa transceiver 120 so that the LoRa transceiver 120 embeds a second flag in a request when sending the request to the backend control apparatus 300 and sets the LoRa transceiver 140 so that the LoRa transceiver 140 embeds the second flag in the request when sending the request to the backend control apparatus 300. In this way, the LoRa transceiver 120 and the LoRa transceiver 140 are considered a second network node by the backend control apparatus 300. The terminal device 400 is allowed to communicate with the backend control apparatus 300 via the first network node or the second network node.

In an embodiment, in practice, the first network node is logically constituted by the LoRa transceivers 150 to 170, so the first network node is capable of providing a 24-frequency-band service to the terminal device 400. Also, in practice, the second network node is constituted by the LoRa transceiver 120 and the LoRa transceiver 140, so the second network node is capable of providing a 16-frequency-band service to the terminal device 400. At this point, the LoRa transceiver 110, the LoRa transceiver 130, the LoRa transceiver 180 and the LoRa transceiver 190 have not been used yet. In an embodiment, the backend control apparatus 300 sets the LoRa transceiver 130 and LoRa transceiver 180 as backup transceivers to be shared by the first network node and the second network node, instead of selecting a backup LoRa transceiver for an individual network node.

In this embodiment, the backend control apparatus 300 selectively activates the two backup transceivers according to the operating statuses of the LoRa transceiver 170 and the LoRa transceiver 140 and the idling status of each of the two backup transceivers. Moreover, the backend control apparatus 300 assigns the second set of frequency bands (the ninth frequency band to the sixteenth frequency band) to the activated backup transceiver and selectively sets the activated backup transceiver according to the operating statuses of the LoRa transceiver 140 and the LoRa transceiver 170. For example, the backend control apparatus 300 selects the LoRa transceiver 130 as a first priority backup transceiver and selects the LoRa transceiver 180 as a second priority backup transceiver. If the LoRa transceiver 170 of the first network node malfunctions, and both of the LoRa transceiver 130 and the LoRa transceiver 180 are in an idling status at this moment, the backend control apparatus 300 activates the LoRa transceiver 130, assigns the second set of frequency bands to the LoRa transceiver 130 and sets the LoRa transceiver 130 so that the LoRa transceiver 130 embeds the first flag in data or a request when sending the data or the request to the backend control apparatus 300. In this way, the role of the LoRa transceiver 170 is substituted by the LoRa transceiver 130 in the first network node.

At this moment, if the LoRa transceiver 140 also malfunctions, and the backend control apparatus 300 has checked that the LoRa transceiver 130 has been used by the first network node, the backend control apparatus 300 then activates the second priority LoRa transceiver 180, assigns the second set of frequency bands to the LoRa transceiver 180 and sets the LoRa transceiver 180 so that the LoRa transceiver 180 embeds the second flag in data or a request when sending the data or the request to the backend control apparatus 300. In this way, the role of the LoRa transceiver 140 is substituted by the LoRa transceiver 180 in the second network node.

In an embodiment, if the first transceiver (e.g. the LoRa transceiver 150), through which the terminal device can do a variety of function settings, in the first network node malfunctions, the backend control apparatus 300 will reset the first network node. More specifically, functional LoRa transceivers which are not in use include the LoRa transceiver 110, the LoRa transceiver 160, the LoRa transceiver 170 and the LoRa transceiver 190 after the first network node is terminated. The LoRa transceiver 120 and the LoRa transceiver 140 belong to the second network node, and the LoRa transceiver 130 and the LoRa transceiver 180 are backup transceivers. Thus, from the LoRa transceivers 110, 160, 170 and 190, the backend control apparatus 300 selects the LoRa transceiver 160 as the first transceiver of the first network node, selects the LoRa transceiver 170 as the second transceiver of the first network node, and selects the LoRa transceiver 190 as the third transceiver of the first network node. The relevant setting method has been described in aforementioned embodiments and thus, is not repeated here.

Based on the description above, via the aforementioned setting and operating, the frequency band which can be provided together by the first transceiver and the second transceiver is the union of the first set of frequency bands and the second set of frequency bands. Thus, more available frequency bands can be used by the terminal device than by a transceiver. Moreover, the first transceiver and the second transceiver are considered a network node by the mother node (e.g. the backend control apparatus) via the first flag.

What is claimed is:

1. A method for controlling Long Range (LoRa) Wide Area Network (WAN) apparatuses, comprising:
   selecting a first transceiver among a plurality of transceivers and assigning a first set of frequency bands to the first transceiver;
   selecting a second transceiver from the plurality of transceivers and assigning a second set of frequency bands to the second transceiver, wherein the second set of frequency bands is different from the first set of frequency bands; and
   setting the first transceiver so that the first transceiver embeds a first flag in a first request when sending the first request to a mother node and setting the second transceiver so that the second transceiver embeds the first flag in the first request when sending the first request to the mother node.

2. The method according to claim 1, further comprising:
   selecting a third transceiver among the plurality of transceivers;
   assigning a third set of frequency bands to the third transceiver, wherein the third set of frequency bands is different from the first set of frequency bands; and
   setting the third transceiver so that the third transceiver embeds the first flag in the first request when sending the first request to the mother node.

3. The method according to claim 2, wherein the third set of frequency bands is at least partially the same as the second set of frequency bands.

4. The method according to claim 3, wherein a position of the third transceiver is different from a position of the second transceiver, and the third set of frequency bands is exactly the same as the second set of frequency bands.

5. The method according to claim 3, wherein the third set of frequency bands is exactly the same as the second set of frequency bands, and the method further comprises:
selectively activating the third transceiver according to an operating status of the second transceiver.

6. The method according to claim 1, wherein the second transceiver is selected among the plurality of transceivers according to a position of the first transceiver.

7. The method according to claim 1, further comprising:
selecting a third transceiver among the plurality of transceivers and assigning the first set of frequency bands to the third transceiver, wherein a position of the third transceiver is different from a position of the first transceiver;
selecting a fourth transceiver among the plurality of transceivers and assigning the second set of frequency bands to the fourth transceiver; and
setting the third transceiver so that the third transceiver embeds a second flag in a second request when sending the second request to the mother node and setting the fourth transceiver so that the fourth transceiver embeds the second flag in the second request when sending the second request to the mother node.

8. The method according to claim 7, further comprising:
selecting a backup transceiver among the plurality of transceivers.

9. The method according to claim 8, wherein the backup transceiver is selectively activated according to an operating status of the second transceiver, an operating status of the fourth transceiver and an idling status of the backup transceiver, and the second set of frequency bands is assigned to the backup transceiver, and the backup transceiver is set selectively according to the operating status of the second transceiver and the operating status of the fourth transceiver so that the backup transceiver embeds the first flag in the first request when sending the first request to the mother node, or the backup transceiver embeds the second flag in the second request when sending the second request to the mother node.

* * * * *